United States Patent
Thompson et al.

(10) Patent No.: US 9,827,901 B1
(45) Date of Patent: Nov. 28, 2017

(54) SYSTEM AND METHOD FOR DYNAMICALLY PROJECTING INFORMATION FROM A MOTOR VEHICLE

(71) Applicant: Dura Operating, LLC, Auburn Hills, MI (US)

(72) Inventors: Aaron Evans Thompson, Grand Blanc, MI (US); Cumhur Uneveren, Walled Lake, MI (US)

(73) Assignee: DURA Operating, LLC, Auburn Hills, MI (US)

( * ) Notice: Subject to any disclaimer, the term of this patent is extended or adjusted under 35 U.S.C. 154(b) by 0 days.

(21) Appl. No.: 15/165,738

(22) Filed: May 26, 2016

(51) Int. Cl.
*B60Q 1/34* (2006.01)
*G03B 21/20* (2006.01)
*G03B 29/00* (2006.01)
*G03B 21/14* (2006.01)

(52) U.S. Cl.
CPC ............ *B60Q 1/34* (2013.01); *G03B 21/145* (2013.01); *G03B 21/2053* (2013.01); *G03B 29/00* (2013.01); *B60Q 2400/40* (2013.01); *B60Q 2400/50* (2013.01)

(58) Field of Classification Search
CPC .... G03B 21/006; G03B 21/10; G03B 21/145; G03B 21/606; B60R 2300/20; B60R 2300/105; B60R 2300/303; B60R 2300/602; G06F 3/04815; G06F 3/04883
See application file for complete search history.

(56) References Cited

U.S. PATENT DOCUMENTS

| | | | |
|---|---|---|---|
| 5,289,321 A | 2/1994 | Secor | |
| 6,733,134 B2* | 5/2004 | Bleiner | B60Q 1/52 116/28 R |
| 8,170,070 B2 | 5/2012 | Boomer et al. | |
| 2002/0126206 A1 | 9/2002 | Hunte | |
| 2003/0146831 A1 | 8/2003 | Berberich et al. | |
| 2010/0283590 A1* | 11/2010 | Tee | A42B 3/044 340/432 |
| 2011/0032484 A1* | 2/2011 | Seal | G03B 21/30 353/13 |
| 2011/0273671 A1 | 11/2011 | Chu | |
| 2012/0315027 A1 | 12/2012 | Schutz | |
| 2013/0052614 A1* | 2/2013 | Mollicone | G09B 19/167 434/65 |
| 2013/0120572 A1 | 5/2013 | Kwon | |
| 2013/0235351 A1* | 9/2013 | Sachdev | B60R 1/00 353/13 |

(Continued)

FOREIGN PATENT DOCUMENTS

CN 203358457 U 12/2013
DE 102011119923 A1 5/2013

*Primary Examiner* — Sultan Chowdhury
(74) *Attorney, Agent, or Firm* — Robert E. Ford; Steven L. Crane; Raymond J. Vivacqua (57) ABSTRACT

A method for projecting information from a motor vehicle to an observer external to the motor vehicle includes receiving, by a controller, a data signal indicative of an operating state of the motor vehicle from a sensor, determining, using the controller, a projection profile based on the data signal which includes a dynamic feature and indicative of a status of the motor vehicle, and continuously projecting the projection profile onto a surface on which the motor vehicle is traveling using a dynamic projector system that animates the dynamic feature.

21 Claims, 4 Drawing Sheets

(56) References Cited

U.S. PATENT DOCUMENTS

2014/0028980 A1* 1/2014 Othmer .................... B60Q 1/50
 353/14
2015/0022664 A1* 1/2015 Pflug ...................... H04N 7/181
 348/148

* cited by examiner

SYSTEM AND METHOD FOR DYNAMICALLY PROJECTING INFORMATION FROM A MOTOR VEHICLE

FIELD

The invention relates generally to a system and method for dynamically projecting information from a motor vehicle, and more particularly to a system and method for projecting a dynamic projection profile based on a data signal which is indicative of a status of the motor vehicle.

BACKGROUND

The statements in this section merely provide background information related to the present disclosure and may or may not constitute prior art.

Motor vehicles have been designed with increasingly advanced technologies aimed at improving the safety, efficiency, and performance of the motor vehicle. Examples of such technologies include advanced driver assistance systems and human machine interface systems. Generally, advanced driver assistance systems automate, adapt, or enhance vehicle systems in order to increase vehicle safety and/or operator driving performance. Advanced driver assistance systems are designed to avoid accidents by offering technologies that alert the driver to potential problems or to avoid collisions by implementing safeguards, such as autonomously controlling the vehicle. Operator driving performance may be improved by using features that enhance certain systems, such as automated lighting, automated parking, adaptive cruise control, automated braking, or improved blind spot elimination using camera technology. Human machine interface systems generally include systems that provide graphics-based visualization of a control system, either to the user of the motor vehicle or to an individual external to the motor vehicle. An example of such a device is a projector system that projects images onto or around the motor vehicle to communicate information regarding the status of the motor vehicle.

Conventional projector systems, while useful for their intended purpose, are limited in their ability to project information. Therefore, there is a need in the art for a system and method for projecting information that provides dynamic and predictive information to an observer of the motor vehicle.

SUMMARY

A method for projecting information from a motor vehicle to an observer external to the motor vehicle is provided. The method includes receiving, by a controller, a data signal indicative of an operating state of the motor vehicle from a sensor, determining, using the controller, a projection profile based on the data signal which includes a dynamic feature and indicative of a status of the motor vehicle, and continuously projecting the projection profile onto a surface on which the motor vehicle is traveling using a dynamic projector system that animates the dynamic feature.

In one aspect, the data signal is a steering angle and the sensor is a steering wheel angle sensor.

In another aspect, the projection profile is a vector of the motor vehicle relative to a flat surface calculated, by the controller, as a function of the steering angle.

In another aspect, the vector is indicative of a path of the motor vehicle.

In another aspect, the vector aligns with a front tire of the motor vehicle.

In another aspect, the vector aligns with a front portion of the motor vehicle.

In another aspect, the dynamic feature moves in real time and is indicative of a direction of travel of the motor vehicle.

In another aspect, the data signal is a turn signal activation identifier and the sensor is a turn signal sensor.

In another aspect, the projection profile is a turn signal identifier and the dynamic feature includes animated arrows that indicate the direction of an intended turn.

In another aspect, receiving, by the controller, a data signal indicative of an operating state of the motor vehicle from a sensor includes receiving, by the controller, a plurality of data signals from a plurality of sensors.

In another aspect, the plurality of data signals include a PRNDL status from a shift sensor indicative of the driving state of the motor vehicle from one of a park, reverse, neutral, drive, and low drive vehicle driving state, a lighting status from a lighting sensor indicative of the brightness of the environment of the motor vehicle, a vehicle speed from a vehicle speed sensor, and a door status from a door sensor indicative of the position of a door of the motor vehicle.

In another aspect, the projection profile is a trajectory of the motor vehicle based on the vehicle speed, and wherein the projection profile is projected to a rear of the motor vehicle when the PRNDL status is reverse and the lighting status is below a brightness threshold and the door status indicates the door is closed.

In another aspect, the projection profile is projected to a front of the motor vehicle when the when the PRNDL status is drive and the lighting status is below a brightness threshold and the door status indicates the door is closed.

In another aspect, the method includes receiving, by the controller, a data signal indicative of a brightness level in an environment of the motor vehicle from a lighting sensor, wherein a brightness of the projection profile is a function of the brightness level of the environment.

In another aspect, the data signal is a door status of the motor vehicle from a door status sensor, and the projection profile has a message communicating the door status.

In another aspect, the data signal is a unique identifier from a motor vehicle key and the projected profile is a unique message associated with the unique identifier.

In another aspect, the dynamic projection system is mounted to a side of the motor vehicle.

Another method for projecting information from a motor vehicle to an observer external to the motor vehicle is provided. The method includes receiving, by a controller, a steering angle from a steering wheel angle sensor, calculating, using the controller, a vector of the motor vehicle relative to a flat surface as a function of the steering angle, wherein the vector indicates the projected path of the motor vehicle, and projecting the vector of the motor vehicle onto a surface on which the motor vehicle is traveling using a dynamic projector system mounted on the motor vehicle.

In one aspect, the vector of the motor vehicle includes a dynamic feature that is animated in real-time by the dynamic projector system.

Another method for projecting information from a motor vehicle to an observer external to the motor vehicle is provided. The method includes receiving, by a controller, a plurality of data signals indicative of an operating state of the motor vehicle including a steering angle, a turn signal activation identifier, a PRNDL status indicative of the driving state of the motor vehicle from one of a park, reverse, neutral, drive, and low drive vehicle driving state, a lighting status indicative of the brightness of the environment of the motor vehicle, and a vehicle speed, determining, using the controller, one of a plurality of projection profiles based on the plurality of data signals, wherein each of the plurality of projection profiles include a dynamic feature and is indicative of a status of the motor vehicle, and the plurality of projection profiles includes a first projection profile which displays a vector of the motor vehicle relative to a flat surface as a function of the steering angle, a second projection profile which displays a trajectory of the motor vehicle based on the vehicle speed, and a third projection profile which displays an intended turn direction based on the turn signal activation identifier, projecting the one of the plurality of projection profiles onto a surface using a dynamic projector system that animates the dynamic feature, wherein the first projection profile and third projection profile are projected to either side of the motor vehicle and the second projection profile is projected to a rear of the motor vehicle when the PRNDL status is reverse and to a front of the motor vehicle when the PRNDL status is drive, and adjusting the brightness of the projected projection profile based on the lighting status.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
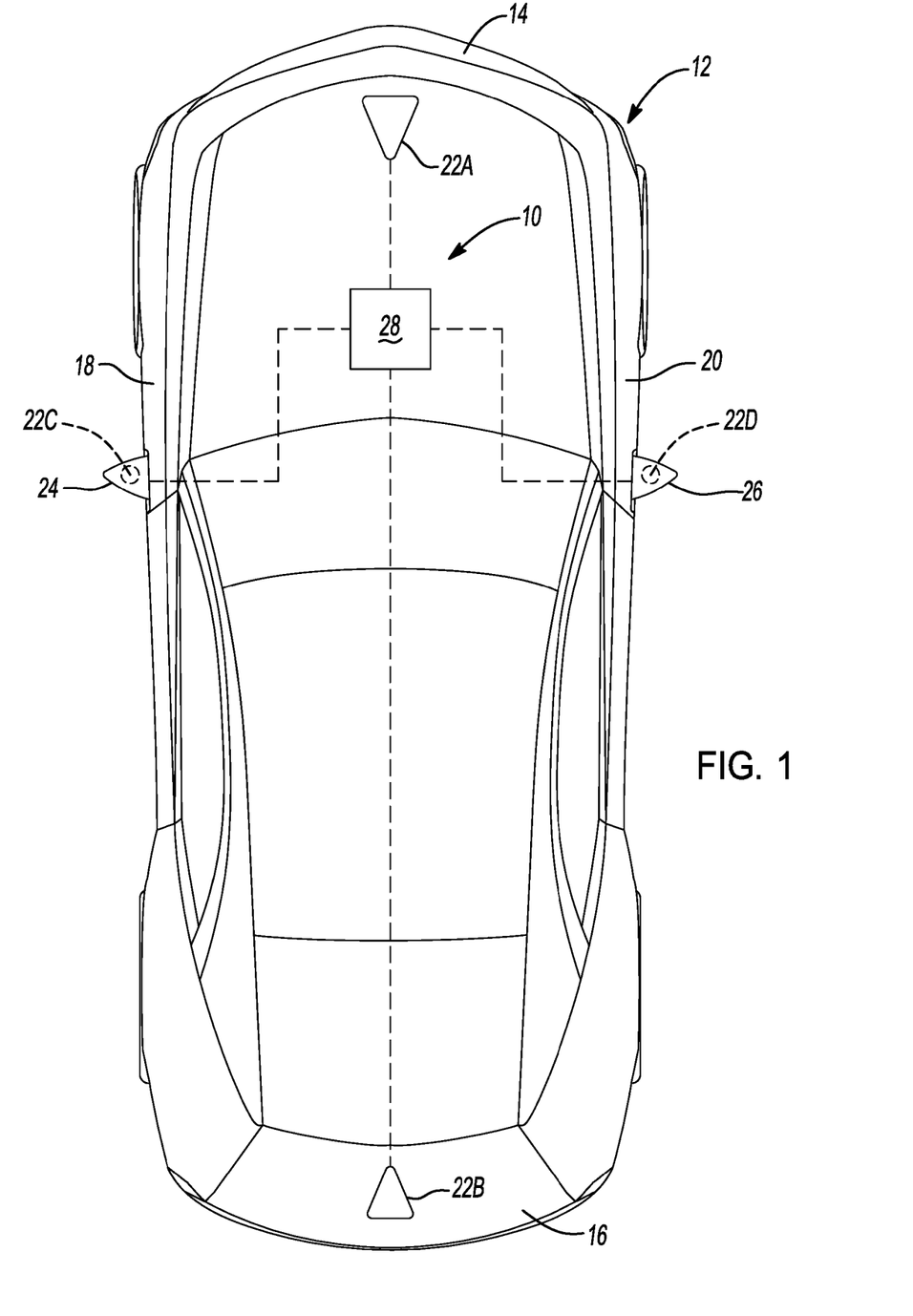
FIG. 1 is a top view of an exemplary motor vehicle having a dynamic projection system according to the principles of the present disclosure.

With reference to FIG. 1, a dynamic projection system is illustrated and indicated generally by reference number 10. The dynamic projection system 10 is shown in use with an exemplary motor vehicle 12. In the example provided, the motor vehicle 12 is illustrated as a passenger vehicle. However, the motor vehicle 12 may be a truck, sport utility vehicle, van, motor home, or any other type of vehicle without departing from the scope of the present disclosure. Relative to an operator of the motor vehicle 12, the motor vehicle 12 includes a front 14, a rear 16, a left side 18, and a right side 20.

The dynamic projection system 10 includes one or more dynamic projectors 22 mounted to an exterior of the motor vehicle 12. For example, the dynamic projection system 10 may include one of, or a combination of, a front dynamic projector 22A, a rear dynamic projector 22B, a left side dynamic projector 22C, and a right side dynamic projector 22D. The front dynamic projector 22A is mounted to the front 14 of the motor vehicle 12. The rear dynamic projector 22B is mounted to the rear 16 of the motor vehicle 12. The left side dynamic projector 22C is mounted to the left side 18 of the motor vehicle 12. The right side dynamic projector is mounted to the right side 20 of the motor vehicle 12. In the example provided, the left and right side projectors 22C, 22D are housed within left and right side view mirrors 24 and 26, respectively. Alternatively, the left and right side projectors 22C, 22D may be housed within multifunctional electronic armatures that replace the left and right side view mirrors 24 and 26. An example of a multifunctional electronic armature is shown and described in commonly assigned U.S. application Ser. No. 15/165,022, filed May 26, 2016, the entirety of which is hereby incorporated by reference. The dynamic projectors 22A-D are preferably laser projectors, such as RGB laser projectors or phosphorus laser projectors, capable of emitting or projecting a projection profile onto a surface.

Figure 2:
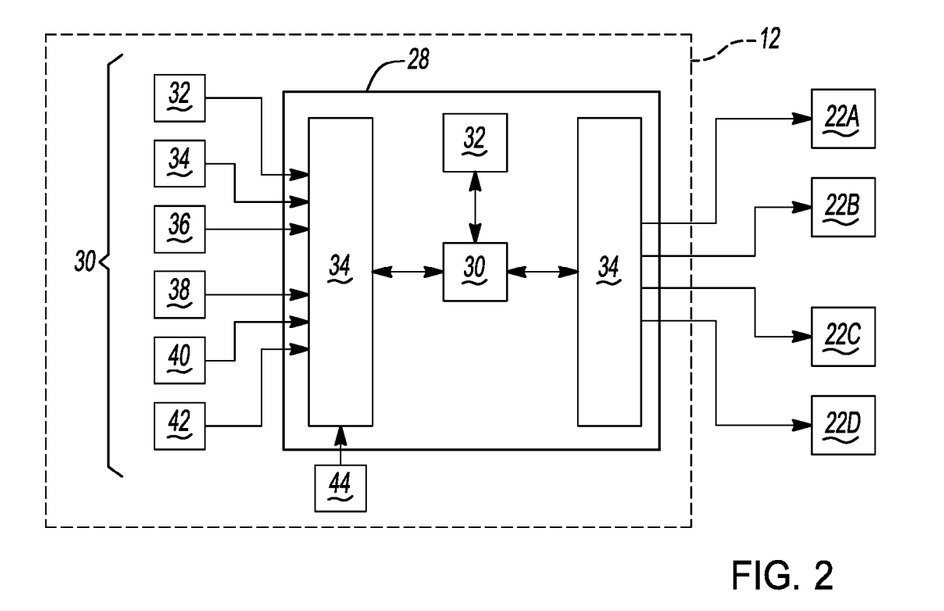
FIG. 2 is a schematic view of the dynamic projection system.

Turning to FIG. 2, each of the dynamic projectors 22A-D are in electronic communication with a controller or electronic control unit (ECU) 28 via any wired connection, for example a vehicle bus network. The ECU 28 is mounted within the motor vehicle 12 and may be a dedicated projector controller or an engine control module, a transmission control module, a body control module, an infotainment control module, etc. The ECU 28 is a non-generalized, electronic control device having a preprogrammed digital computer or processor 29, memory or non-transitory computer readable medium 31 used to store data such as control logic, instructions, image data, lookup tables, etc., and a plurality of input/output peripherals or ports 33. The processor 29 is configured to execute the control logic or instructions. Alternatively, each of the dynamic projectors 22A-D may have a local projector controller in communication with the ECU 28. An example of this controller system for a dynamic projector is shown and described in commonly assigned U.S. application Ser. No. 15/165,055, filed May 26, 2016, the entirety of which is hereby incorporated by reference.

The ECU 28 is in electronic communication with a plurality of sensors 30 mounted to the motor vehicle 12. The sensors 30 are operative to provide information or data signals to the ECU 28 indicative of an operating state of the motor vehicle 12. For example, the sensors 30 include a steering wheel angle sensor 32, a turn signal sensor 34, a shift sensor 36, a lighting sensor 38, a vehicle speed sensor 40, a door sensor 42, and a security data receiver 44. The steering wheel angle sensor 32 detects or senses a steering wheel angle indicative of a degree of turn of the motor vehicle 12. The turn signal sensor 34 detects whether a left or right turn signal has been activated in the motor vehicle 12. The shift sensor 36 detects the driving state of the motor vehicle 12. For example, the driving state may be a one of a park, reverse, neutral, drive, and low drive (PRNDL) vehicle driving state. The lighting sensor 38 detects a brightness of the environment, i.e. the illumination intensity of the ambient lighting surrounding the motor vehicle 12. The vehicle speed sensor 40 detects a vehicle speed of the motor vehicle 12. The door sensor 42 detects a status of a vehicle door, such as open or closed, latched or unlatched. The security data receiver 44 is a wireless receiver configured to detect a security identifier from, for example, a key fob. The security identifier may include a personal identification number that authenticates the owner of the motor vehicle 12.

Figure 3:
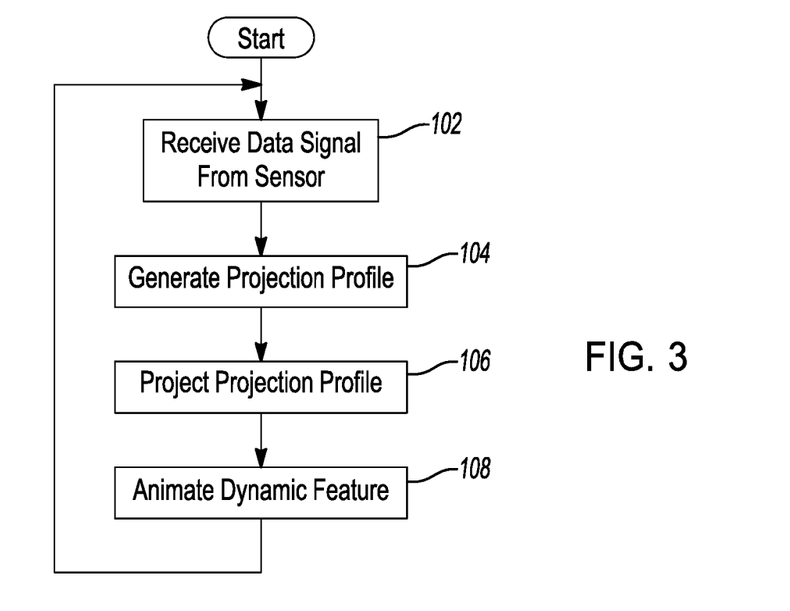
FIG. 3 is a flow chart illustrating a method for dynamically projecting information using the dynamic projection system.

Turning to FIG. 3, and with continued reference to FIGS. 1-2, a method for projecting information using the dynamic projection system 10 is indicated generally by reference number 100. The method 100 begins at step 102 when the ECU 28 receives data signals from one of, or a combination of, the plurality of sensors 30. The data signals are indicative of an operating state of the motor vehicle 12. For example, the data signals may include a steering angle detected from the steering wheel angle sensor 32. The data signals may include a turn signal activation identifier detected from the turn signal sensor 34. The data signals may include a PRNDL status detected from the shift sensor 36 indicative of the driving state of the motor vehicle from one of the park, reverse, neutral, drive, and low drive vehicle driving states. The data signals may include a lighting status from the lighting sensor 38 indicative of the brightness of the environment of the motor vehicle 12. The data signals may include a vehicle speed from the vehicle speed sensor 40. The data signals may include a door status from the door sensor 42 indicative of the position of a door of the motor vehicle 12. The data signals may include a unique identifier indicative that a key fob associated with the motor vehicle 12 is proximate the motor vehicle 12.

The method 100 proceeds to step 104 where the ECU 28 determines or generates a projection profile based on the data signals from the plurality of sensors 30. The projection profile is a graphical image or other visual representation of information relating to the particular data signals received by the ECU 28 at step 102. The projection profile quantifies the data signals to inform an individual external to the motor vehicle 12 of a state of the motor vehicle 12. The projection profile preferably includes a dynamic feature. The dynamic feature is a set of graphical images that may be animated by the dynamic projector.

The method 100 then proceeds to step 106 where the dynamic projectors 22 continuously projects the projection profile onto a surface on which the motor vehicle 12 is running. At step 108 the dynamic projectors 22 animate the dynamic feature of the projection profile. The method 100 then repeats, allowing for projection updates as the operating conditions of the motor vehicle 12 change.

Figures 4, 5:
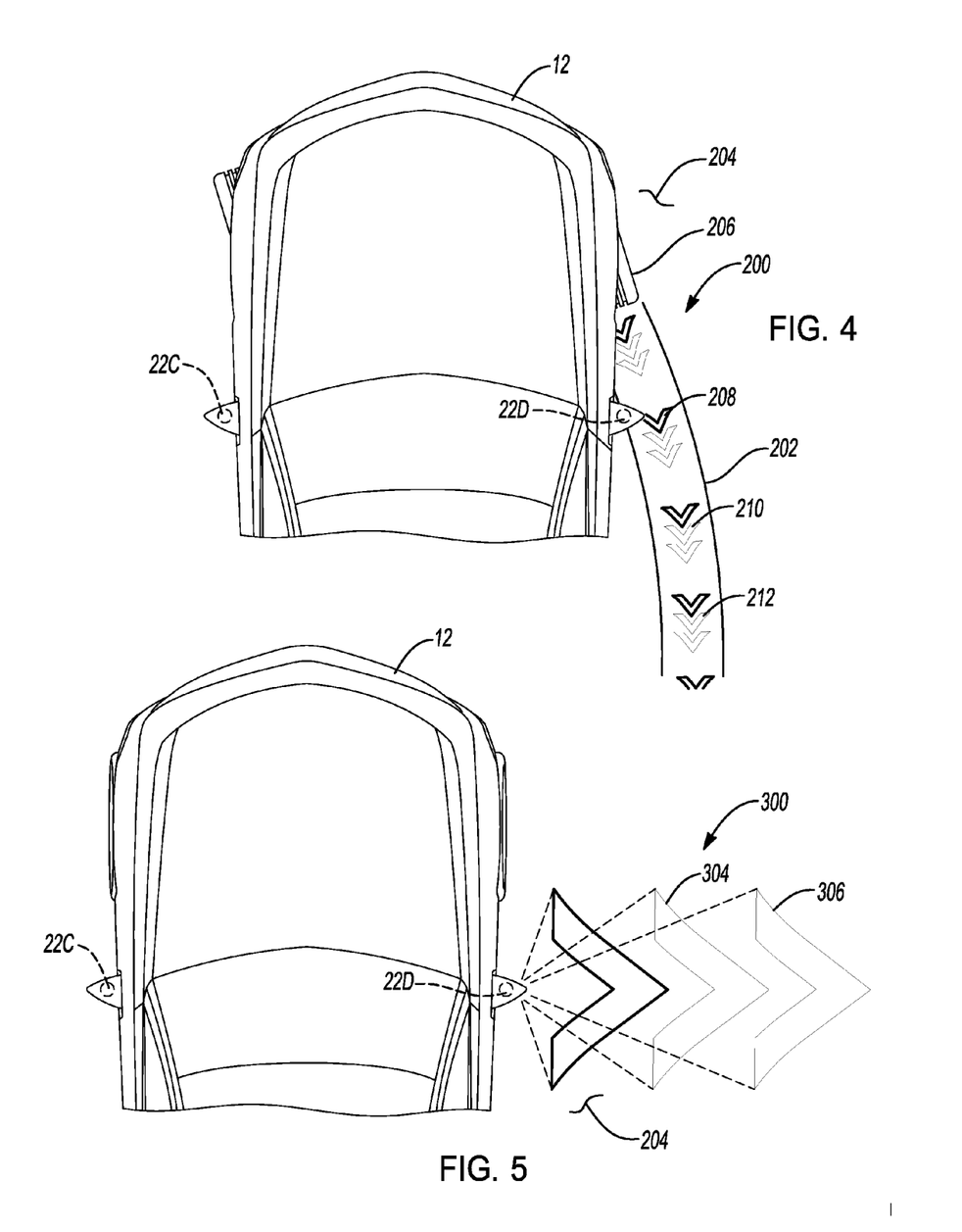
FIG. 4 is a top view of a first exemplary projection profile.
FIG. 5 is a top view of a second exemplary projection profile.

Turning to FIG. 4, an example of a projection profile is illustrated relative to the motor vehicle 12 and indicated by reference number 200. The projection profile 200 is projected from the right side projector 22D or the left side projector 22C. The projection profile 200 is calculated from the sensed steering angle and includes a vector 202 of the motor vehicle 12 projected to a relatively flat surface 204, such as a road, driveway, parking lot, etc. The vector 202 is indicative of a path of movement of the motor vehicle 12. In one example, the vector 202 aligns with a front tire 206 of the motor vehicle 12. Alternatively, the vector 202 may align with the front 14 of the motor vehicle 12. The projection profile 200 preferably includes a dynamic feature 208. In the example provided, the dynamic feature 208 is a set of arrows 210, 212 that, when animated, travel along a length of the vector 202 over time. The dynamic feature 208 preferably indicates a direction of travel of the motor vehicle 12. When the steering angle is zero, thus indicating no turn, the projection profile 200 may be a vector parallel with the motor vehicle 12.

Turning to FIG. 5, another example of a projection profile is illustrated relative to the motor vehicle 12 and indicated by reference number 300. The projection profile 300 is projected from the right side projector 22D or the left side projector 22C. The projection profile 300 is calculated from the sensed turn signal indicator and includes an arrow 302 projected to the surface 204. The arrow 302 is indicative of the intention of the motor vehicle 12 to turn, based on the activation of the turn signal. In the example provided, the dynamic feature is a set of additional arrows 304, 306 that, when animated, travel away from the motor vehicle 12.

Figure 6:
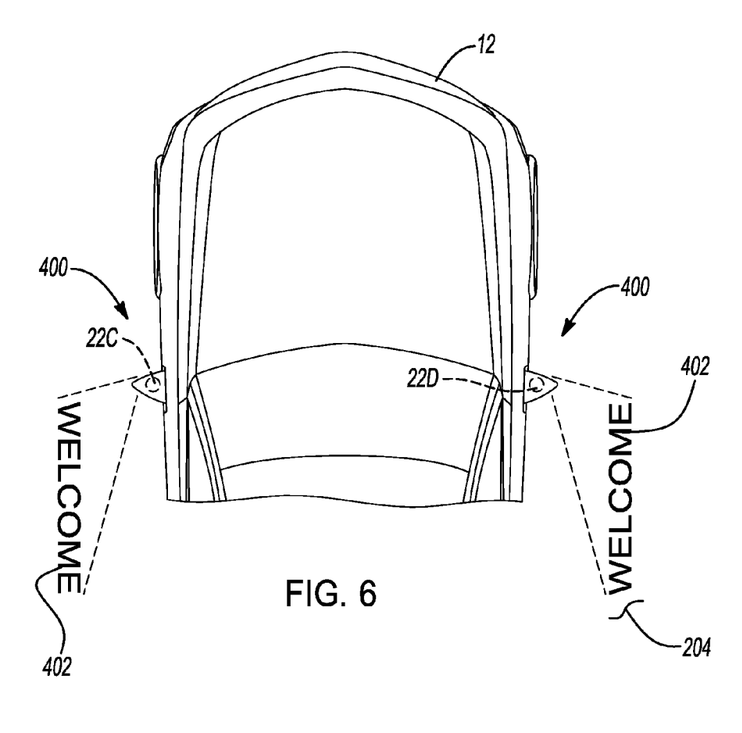
FIG. 6 is a top view of a third exemplary projection profile.

Turning to FIG. 6, another example of a projection profile is illustrated relative to the motor vehicle 12 and indicated by reference number 400. The projection profile 400 is projected from the right side projector 22D and the left side projector 22C. The projection profile 400 is calculated from the sensed unique identifier and includes a message 402 projected to the surface 204. The message may be personalized based on the personal identification number or a generalized message. The dynamic feature may be animated lettering.

Figure 7:
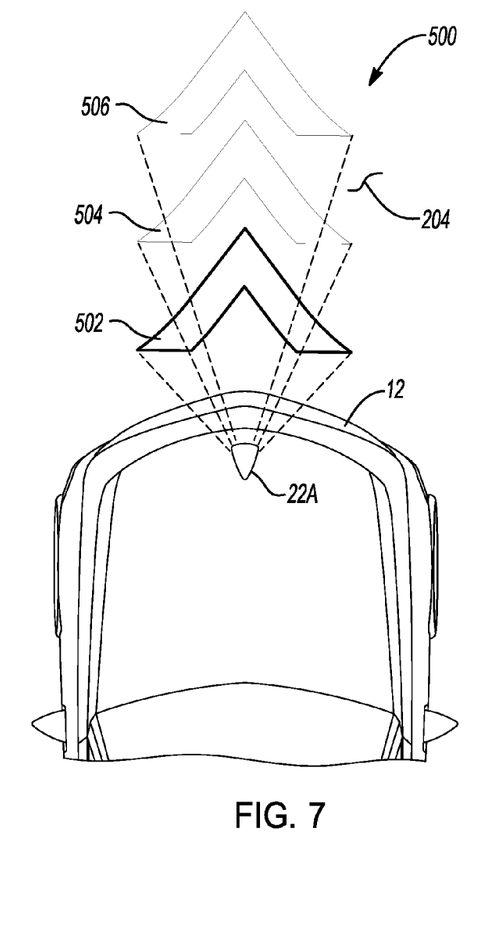
FIG. 7 is a top view of a fourth exemplary projection profile.

With reference to FIG. 7, another example of a projection profile is illustrated relative to the motor vehicle 12 and indicated by reference number 500. The projection profile 500 is projected from the front projector 22A or the rear projector 22B. The projection profile 500 is calculated from the vehicle speed and the PRNDL status and includes an arrow 502 projected to the surface 204. The arrow 502 is indicative of the intention of the motor vehicle 12 to move either forward when the PRNDL status indicates a drive shift condition or backwards when the PRNDL status indicates a reverse shift position. Thus, which projector 22A, 22B is used is based on whether the shift condition is drive or reverse. In the example provided, the dynamic feature is a set of additional arrows 504, 506 that, when animated, travel away from the motor vehicle 12. The length of the animation may be based on the vehicle speed wherein a greater vehicle speed in turn generates additional arrows.

Each of the projection profiles 200, 300, 400, and 500 may further be modified by the lighting status and the door status. For example, if the lighting status is above a brightness threshold, the ECU 28 may determine not to project the projection profile. Likewise, if the door status indicates that the motor vehicle door is open, the ECU 28 may determine not to project the projection profile. Alternatively, a brightness of the projection profile may be a function of the sensed lighting status of the environment. In another example, the projection profile may include a message communicating the door status, such as "door open".

The description of the invention is merely exemplary in nature and variations that do not depart from the gist of the invention are intended to be within the scope of the invention. Such variations are not to be regarded as a departure from the spirit and scope of the invention.

The following is claimed:

1. A method for projecting information from a motor vehicle to an observer external to the motor vehicle, the method comprising: receiving, by a controller, a data signal indicative of an operating state of the motor vehicle from a sensor; determining, using the controller, a projection profile based on the data signal, wherein the projection profile includes a dynamic feature and is indicative of a status of the motor vehicle; and continuously projecting the projection profile onto a surface on which the motor vehicle is traveling using a dynamic projector system that animates the dynamic feature, wherein the projection profile is a vector of the motor vehicle relative to a flat surface calculated, by the controller, as a function of a steering angle.

2. The method of claim 1 wherein the data signal is the steering angle and the sensor is a steering wheel angle sensor.

3. The method of claim 1 wherein the vector is indicative of a path of the motor vehicle.

4. The method of claim 3 wherein the vector aligns with a front tire of the motor vehicle.

5. The method of claim 3 wherein the vector aligns with a front portion of the motor vehicle.

6. The method of claim 1 wherein the dynamic feature moves in real time and is indicative of a direction of travel of the motor vehicle.

7. The method of claim 1 wherein receiving, by the controller, further includes a plurality of data signals from a plurality of sensors.

8. The method of claim 7 wherein the plurality of data signals include a PRNDL status from a shift sensor indicative of the driving state of the motor vehicle from one of a park, reverse, neutral, drive, and low drive vehicle driving state, a lighting status from a lighting sensor indicative of the brightness of the environment of the motor vehicle, a vehicle speed from a vehicle speed sensor, and a door status from a door sensor indicative of the position of a door of the motor vehicle.

9. The method of claim 8 wherein the projection profile is a trajectory of the motor vehicle based on the vehicle speed, and wherein the projection profile is projected to a rear of the motor vehicle when the PRNDL status is reverse and the lighting status is below a brightness threshold and the door status indicates the door is closed.

10. The method of claim 9 wherein the projection profile is projected to a front of the motor vehicle when the when the PRNDL status is drive and the lighting status is below a brightness threshold and the door status indicates the door is closed.

11. The method of claim 1 wherein the data signal is a door status of the motor vehicle from a door sensor, and the projection profile has a message communicating the door status.

12. The method of claim 1 wherein the data signal is a unique identifier from a motor vehicle key and the projected profile is a unique message associated with the unique identifier.

13. The method of claim 1 wherein the dynamic projection system is mounted to an exterior side of the motor vehicle.

14. The method of claim 1 wherein the exterior side of the motor vehicle is at least one of a front side, rear side, left side, or right side of the motor vehicle.

15. The method of claim 1 wherein the vector of the motor vehicle is a curvilinear directional indicator.

16. A method for projecting information from a motor vehicle to an observer external to the motor vehicle, the method comprising:
 receiving, by a controller, a data signal indicative of an operating state of the motor vehicle from a sensor; wherein the data signal is a turn signal activation identifier and the sensor is a turn signal sensor,
 determining, using the controller, a projection profile based on the data signal, wherein the projection profile includes a dynamic feature and is indicative of a status of the motor vehicle; and
 continuously projecting the projection profile onto a surface on which the motor vehicle is traveling using a dynamic projector system that animates the dynamic feature.

17. The method of claim 16 wherein the projection profile is a turn signal identifier and the dynamic feature includes animated arrows that indicate the direction of an intended turn.

18. A method for projecting information from a motor vehicle to an observer external to the motor vehicle, the method comprising:
 receiving, by a controller, a steering angle from a steering wheel angle sensor;
 calculating, using the controller, a vector of the motor vehicle relative to a flat surface as a function of the steering angle, wherein the vector indicates the projected path of the motor vehicle; and
 projecting the vector of the motor vehicle onto a surface on which the motor vehicle is traveling using a dynamic projector system mounted on the motor vehicle.

19. The method of claim 18 wherein the vector of the motor vehicle includes a dynamic feature that is animated in real-time by the dynamic projector system.

20. A method for projecting information from a motor vehicle to an observer external to the motor vehicle, the method comprising:
 receiving, by a controller, a plurality of data signals indicative of an operating state of the motor vehicle including a steering angle, a turn signal activation identifier, a PRNDL status indicative of the driving state of the motor vehicle from one of a park, reverse, neutral, drive, and low drive vehicle driving state, a lighting status indicative of the brightness of the environment of the motor vehicle, and a vehicle speed;
 determining, using the controller, one of a plurality of projection profiles based on the plurality of data signals, wherein each of the plurality of projection profiles include a dynamic feature and is indicative of a status of the motor vehicle, and the plurality of projection profiles includes a first projection profile which displays a vector of the motor vehicle relative to a flat surface as a function of the steering angle, a second projection profile which displays a trajectory of the motor vehicle based on the vehicle speed, and a third projection profile which displays an intended turn direction based on the turn signal activation identifier;
 projecting the one of the plurality of projection profiles onto a surface using a dynamic projector system that animates the dynamic feature, wherein the first projection profile and third projection profile are projected to either side of the motor vehicle and the second projection profile is projected to a rear of the motor vehicle when the PRNDL status is reverse and to a front of the motor vehicle when the PRNDL status is drive; and
 adjusting the brightness of the projected projection profile based on the lighting status.

21. A method for projecting information from a motor vehicle to an observer external to the motor vehicle, the method comprising: receiving, by a controller, a data signal indicative of an operating state of the motor vehicle from a sensor, wherein data signal is indicative of a brightness level in an environment of the motor vehicle from a lighting sensor, and wherein a brightness of the projection profile is a function of the brightness level of the environment; determining, using the controller, a projection profile based on the data signal, wherein the projection profile includes a dynamic feature and is indicative of a status of the motor vehicle; and continuously projecting the projection profile onto a surface on which the motor vehicle is traveling using a dynamic projector system that animates the dynamic feature.

\* \* \* \* \*